United States Patent Office 3,621,741
Patented Nov. 23, 1971

3,621,741
MACHINE FOR CUTTING. MORE PARTICULARLY FOR CUTTING OFF THE CORES OF ARTICLES OF PLASTIC MATERIALS
Jacques Bourgeois, Lyon, France, assignor to Lesieur-Cotelle, Boulogne-sur-Seine, France
Filed July 1, 1969, Ser. No. 838,362
Claims priority, application France, July 2, 1968, 50,177
Int. Cl. B23b 3/04, 5/14
U.S. Cl. 82—101                                   5 Claims

ABSTRACT OF THE DISCLOSURE

A machine for cutting burrs from plastic articles comprises a rotatable cell in the form of a tube having opposite open ends, the articles being fed in succession one after the other to the cell where they are held and rotated and brought into contact with the cutter whereafter the articles are fed through the other end of the cell under the action of a continuous suction applied thereto. The articles are held within the cell by means of a pair of pivotal claws which are extended into the cell to hold the article when it is being cut whereafter the claws are retracted to allow the article to pass to the outlet of the cell.

---

Figure 1:
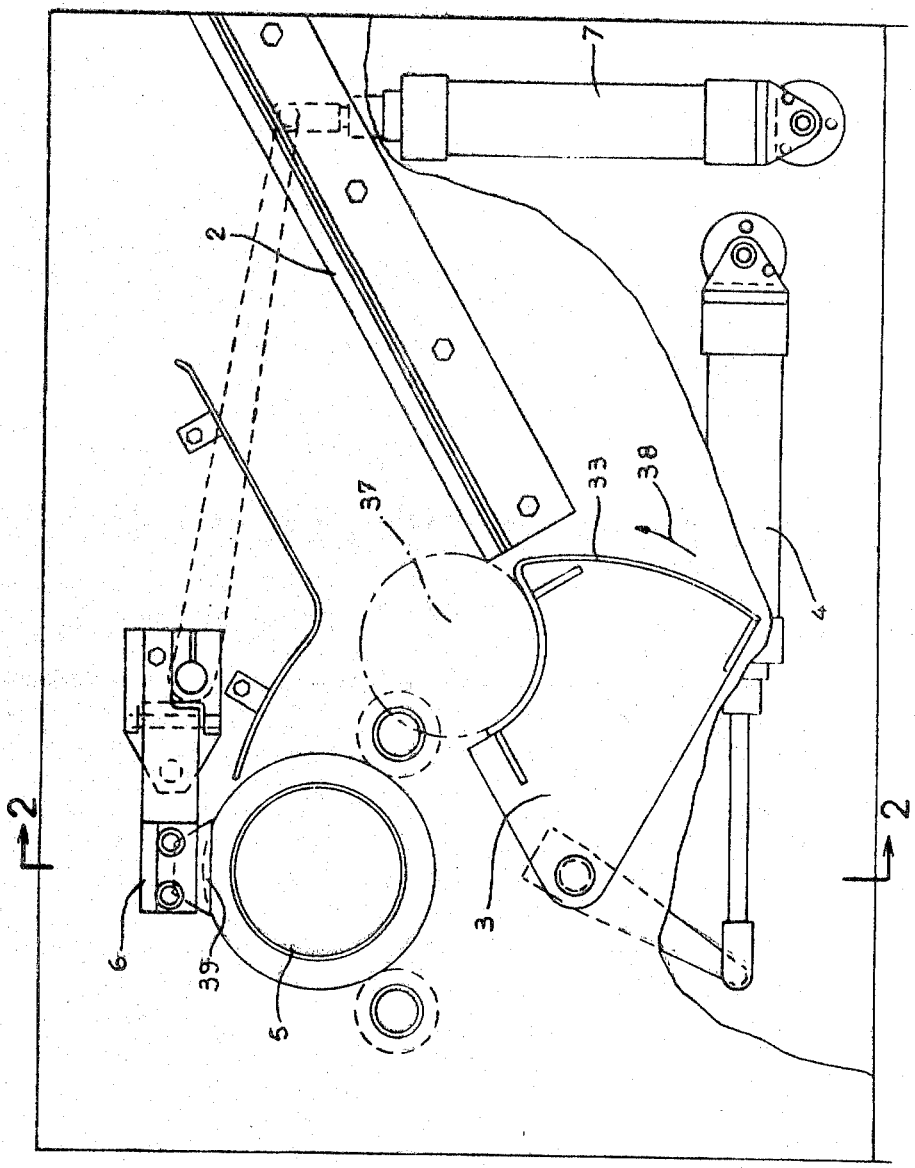

In the manufacture of articles of plastic materials and more particularly of blown plastics, it is necessary for obtaining a vessel having a correct and complete opening, to cut off the upper part of the articles, usually called the core or "expansion head" and which consists of surplus material.

In such cutting machines, the expansion head is usually cut off by rotating the article and applying thereto a cutting blade.

Mainly, in these machines, the rotational drive of the article is achieved by two main methods:

(a) According to the first of these methods, the article is mounted between three cylinders, of which at least one causes the article to revolve by friction. This arrangement has the drawback that it is necessary to provide an article which is perfectly round, without any embossing or opening, and with the risk of exposing this article to deformation under the pressure exerted thereon by the driving cylinder or roller;

(b) According to the second method, the article is placed into a revolving cell and is held in contact with the bottom of this cell by means of a constant suction formed inside the cell. At the end of the cutting operation, the suction is relieved and is replaced by a jet of compressed air which expel the article from the cell.

In the second case, the main drawback is that the article leaves the cell in the direction opposite to that of its entry, making necessary the removal of the device for inserting it.

The invention has the object of eliminating these disadvantages. It provides therefore a cutting machine, particularly for cutting off the burrs of articles made of plastic materials, wherein this cutting is achieved by rotating the article and applying thereto a cutting blade, characterized in that it comprises, in combination, a rotating cell, open at both ends and connected, at its outlet side, to a pneumatic transportation means of the venturi type, means for supplying at regular intervals the articles to be cut to the inlet end orifice of the cell, inside of which they are drawn by a vacuum created inside the cell, and removable means located inside the cell for stopping each article and for ensuring its rotational entrainment during the cutting operation, and for releasing it at the end of this operation.

According to one embodiment of the invention, the means for regularly supplying the rotating cell with articles to be cut comprises a supply chute, which is inclined and on which the vessels or other articles slide, and at the lower part of which there is a distributing device consisting of a mobile block, adapted to move between the lower end of the chute and a zone located upstream of the inlet orifice of the cell, wherein mechanical electromechanic, pneumatic or hydraulic means are provided for moving the block at the correct timing from one end of its travel to the other, wherein the block is also equipped with a table, adapted to close the lower end of the chute when it is not in the end position, in which an article located within the chute can be received.

The means arranged within the cell for stopping the articles during the cutting operation comprises two claws, pivotably mounted on two shafts located in the wall of the cell so that these claws can swivel between two end positions, in one of which they are flush with the outer wall of the cell and in the other of which they protrude radially into the interior of the cell, wherein mechanical, pneumatic, hydraulic or other means, synchronized with the distributor for the articles to be cut, control like movement of the claws in the angular direction from one end position into the other. Preferably, at least one of the claws is equipped with a pin or other member for anchoring the article to be cut, with a view to produce its rotational movement.

Figure 2:
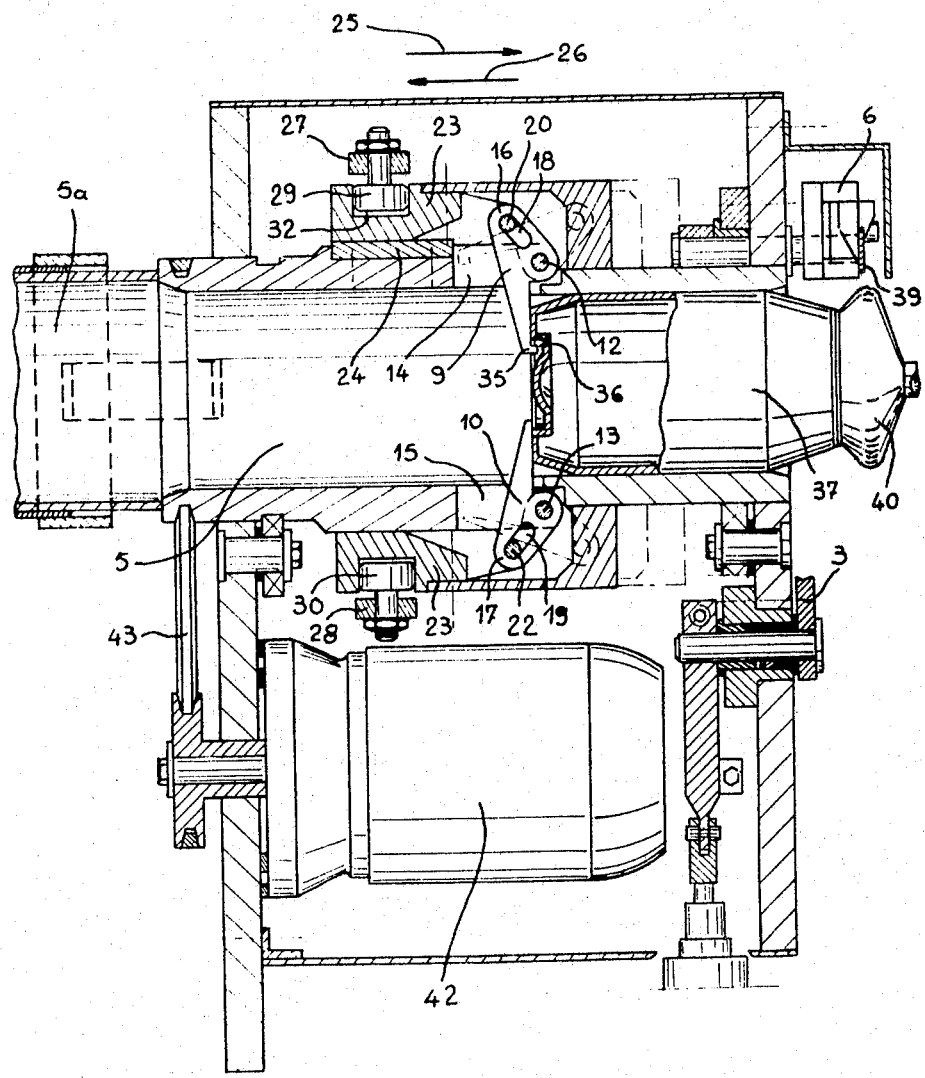

The invention will be further described, with reference to the accompanying drawings, showing by way of non-limiting example, a preferred embodiment of the cutting machine for cutting an object of blown plastic according to the invention, and in which:

FIG. 1 is an elevation view of the assembly, showing the various members forming the same; and FIG. 2 is a cross-section along line 2—2 in FIG. 1.

FIG. 1 shows the general arrangement of the various members or elements forming the cutting machine, namely: a chute 2 for supplying the articles to be treated, a mobile distributing block 3 actuated by a jack 4, which may be pneumatic or hydraulic, a rotating cell 5 and a cutting blade 6, which is preferably movable in two mutually perpendicular directions, as described in French patent application No. 50,172 filed July 2, 1968 of the applicants, in order to overcome possible defects in the shape or in the positioning of the vessel. The cutting blade 6 is actuated by a hydraulic or pneumatic jack 7.

Connected to the outlet 5a of the cell 5 is a vacuum conduit, not shown in the drawing, inside of which continuously circulates a flow of air, created by a venturi-type apparatus, located in the vacuum conduit.

The rotating cell 5 has two claws 9 and 10, extending in the radial direction and hinged to respective shafts 12 and 13, located in two apertures 14 and 15 in the wall of the cell 5. Each claw has a lug 16 and 17, respectively, adapted which is machined a hole 18, and 19, respectively, adapted to receive a lug 20 and 22 integrally formed with a ring 23, connected rotatively with the cell 5 by means of a clamp 24, but capable of moving axially on the cell, in one direction as indicated by arrow 25 in FIG. 2 for producing retraction of the claws 9 and 10, as shown by dash-dot lines in FIG. 2, and on the other hand, in the direction of the arrow 26 for moving the claws back into their initial position, shown by solid lines in the same figure.

The axial movement of the ring 23 is produced by means of a work, the prongs 27 and 28 of which are equipped with rollers 29 and 30, respectively at their ends, which can freely rotate and engage in a circular groove 32 in the periphery of the revolving cell 5. The said fork may be actuated by any known means adapted to produce its movement in the direction of the arrows 25 and 26 in FIG. 2.

To produce the correct entrainment of the vessel by the cell 5, at least one of the claws 9 and 10 has a pin 35, adapted to engage in with a recess 36 provided in the base of the vessel 37.

The operation of this cutting machine is as follows:

Each vessel 37 is supplied by the chute 2 to the distributor 3 which, actuated by the jack 4, pivots in the direction of the arrow 38 in FIG. 1, until the vessel carried thereby is located adjacent the inlet orifice of the revolving cell 5. The vessel is then drawn into the interior of the cell by the constant air flow circulating in this interior and inside the vacuum conduit, until it abuts against the jaws 9 and 10 which are then in the extended position shown in FIG. 2.

In order to retain the vessels in the chute 2 while one such vessel is being processed in the cell 5, and to prevent these from accumulating in the machine, the distributor 3 has, on its face facing the lower end of the chute 3, a platform 33 which serves as stopping member.

The vessel in the cell is then entrained rotatively by the pin 35 of the claw 9, and the cutter 6 is displaced by the jack 7 and the blade 39 of the cutter effects cutting off of the burr or "expansion head" 40, which drops in front of the machine. Once the cutting operation is terminated, the cutter 6 is withdrawn to its starting position and the ring 23 is actuated in the direction of the arrow 25 in FIG. 2, whereby the claws 9 and 10 are pivoted to their retracted positions. The vessel 37, still under the action of the air flow, continues to pass through the cell 5 and is removed in an expulsion conduit. Then the claws 9 and 10 return to their extended driving positions and a new vessel is supplied to the inlet of the cell 5.

Preferably, there is automatic synchronization of the various operations, namely: the displacement of the distributor 3 towards the inlet orifice of the cell 5 and back to its starting position; the approach movement of the cutter 6 and its movement back to its starting position; the withdrawal of the jaws 9 and 10 and their movement back to their starting position so that there is no loss of time.

Finally, it is obvious from the preceding description that the invention is not limited to the embodiment shown above and described merely by way of non-limiting example. It comprises all possible modifications of the embodiment. Thus, for example, instead of being driven by a motor and crown wheel 42, 43, the cell 5 may be driven by pinions and crown wheel and any other suitable means.

I claim:

1. A cutting machine comprising a rotatable cell having opposite open ends, one being an inlet end for supply of articles to be cut and the other being an outlet end for removal of articles after they have been cut, the outlet end being subjected to suction, means for successively supplying articles to be cut to said inlet end of the cell whereat each article is drawn into the cell under the suction applied thereto, a pivotal stop means mounted in said cell for rotation therewith and having a retracted position and an extended position, means for pivoting the stop means between the extended and retracted positions, said stop means in the extended position engaging an article to hold the same in a cutting position in the cell, and in the retracted position allowing the article to continue its travel through the cell to said other end thereof under the suction applied thereat, said stop means including engagement means engageable with an article to rotate the article with the cell, and cutting means mounted adjacent said inlet end of the cell for cutting and article held in the cell by the stop means and rotating with said cell.

2. A cutting machine as claimed in claim 1 wherein said stop means comprises pivotal claws.

3. A cutting machine as claimed in claim 2 wherein said engagement means on said stop means comprises a pin on one of said claws engageable in a recess provided in the article.

4. A cutting machine as claimed in claim 2 comprising an inclined chute on which the articles are successively supplied, said means for supplying the articles to the cell comprising a distributing member movable between said chute and said cell to transport an article from the chute to said cell.

5. A cutting machine as claimed in claim 4 comprising a platform on said distributing member movable in front of the chute when the article is being transported to said cell to prevent subsequent articles from falling off the chute.

References Cited
UNITED STATES PATENTS

| | | | |
|---|---|---|---|
| 3,084,577 | 4/1963 | Kuts | 82—101 X |
| 3,481,232 | 12/1969 | Yann | 82—101 |
| 3,481,233 | 12/1969 | Yann et al. | 82—101 X |
| 3,400,620 | 9/1968 | Armbruster et al. | 82—101 X |

HARRISON L. HINSON, Primary Examiner